Patented Jan. 5, 1954

2,665,295

UNITED STATES PATENT OFFICE 2,665,295

DIESTERS OF DITHIOPHOSPHORIC ACIDS AND TERPENES

Frederick B. Augustine, Jefferson, N. J., assignor to Socony-Vacuum Oil Company, Incorporated, a corporation of New York No Drawing. Original application October 28, 1947, Serial No. 782,672. Divided and this application January 6, 1949, Serial No. 69,602

8 Claims. (Cl. 260—461)

This invention relates to a new process of preparing certain reaction products from diesters of dithiophosphoric acids and terpenes and to the products so prepared.

Prior to this invention the diesters of dithiophosphoric acid were known and had been added in minor quantities to mineral oil, mainly for the purpose of stabilizing the oil. However, these esters have not been entirely satisfactory for this purpose because of their high acidity, their tendency to corrode metals such as copper, and their effect of causing sludge formation in oils. On the other hand, the neutral triesters of dithiophosphoric acid are relatively difficult and expensive to prepare.

Accordingly, it is the purpose of this invention to provide a new and expedient process for producing certain new reaction products from esters of dithiophosphoric acid and terpenes, which reaction products are highly useful addition agents for oil.

To this end the present invention comprises the reaction of diesters of dithiophosphoric acid with terpenes, for example, pinene or dipentene.

Diesters of dithiophosphoric acid can be prepared in a number of ways, but the most generally used method is that of reacting a compound containing an hydroxy group, for example, an alcohol or a phenol, with phorphorus pentasulfide. This reaction proceeds essentially as follows:

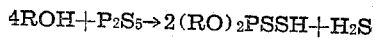

As organic hydroxy compounds for reaction with the phosphorus pentasulfide, normal straight chain alcohols, branched chain alcohols, hydroxy aryl compounds, such as phenol and naphthol, substituted aryl hydroxy compounds, such as diamyl phenol or any other other hydroxy organic material in which the hydroxy group will react with the phosphorus pentasulfide may be used.

In a similar manner, any organic material containing a mercaptan radical may be reacted to produce a thioester corresponding to the oxygen esters described above.

It has now been discovered that the products, the manufacture of which has been described above, can be expediently converted into far less acid, or completely nonacid, products of a far more useful nature, by reacting them with a terpene or a mixture of terpenes.

A variety of terpenes react with secondary esters of dithiophosphoric acid in the manner described generally above. Specifically investigated were pinene, dipentene, allo-ocimene and terpineol, representing, respectively, bicyclic, monocyclic, acyclic and hydroxy terpenes or terpene derivatives. Each of these evidenced positive reaction by evolution of heat and reduction of acidity. However, pinene is the preferred terpene; it yielded neutral products which passed copper corrosion and heat stability tests. The other terpenes did not react to completion, and sufficient residual acidity remained to fail the products in copper corrosion and heat stability tests, even following extended reaction time. Such terpenes may be of utility, however, for example, as a replacement for part of the pinene in some of its reactions.

The temperature necessary to effect the reaction is generally about 100° C. to about 200° C. and the time required is generally less than five hours.

Example I

Four molecular proportions of refined fusel oil and one molecular proportion of phosphorus pentasulfide were mixed and, after the initial reaction had subsided, heated at 90° C. for 2 hours. The neutralization number of the product, essentially diamyldithiophosphoric acid, was 185, expressed as milligrams of potassium hydroxide equivalent to 1 gram of sample.

To 50 grams of this acid was added 38 grams of pinene with immediate evolution of heat. Reaction at 150° C. for 2.5 hours yielded a product of neutralization number 13, containing 6.13% phosphorus and 16.6% sulfur.

Example II

One molecular proportion of phosphorus pentasulfide was carefully added to 4.0 molecular proportions of ethyl alcohol. After the vigorous reaction had subsided, the temperature was maintained at 80° C. for 2 hours. The neutralization number of the product, essentially diethyldithiophosphoric acid, was 263.

The spontaneous reaction upon mixing 186 grams of this acid with 272 grams of pinene carried the temperature to 130° C. After 3 hours reaction at 150° C., the product had a neutralization number of 2. It was washed with dilute alkali and freed of excess pinene by vacuum topping. The residue contained 9.31% phosphorus, 19.6% sulfur and had a neutralization number of 1.5.

Example III

Diphenyldithiophosphoric acid was prepared by heating together 222 grams (1 mol) of phosphorus pentasulfide and 376 grams (4 mols) of phenol. Reaction proceeded rapidly at 130–150° C. and after one-half hour at 150–165° C. no solid remained. The yield of black residue, which solidified at about 80° C. and had a neutralization number of 208, was 558 grams.

To 282 grams of this acid was added 272 grams of pinene with immediate evolution of heat. There was no change in combined weight even after 3 hours reaction at 150° C. Excess pinene was removed by distillation under vacuum, and the yield of a dark red, clear liquid residue was 416 grams. It contained 14.9% sulfur, 7.22% phosphorus and had a neutralization number of 1.

Example IV

An acid, essentially bis (diamylphenyl) dithiophosphoric acid, was prepared by reacting 936 grams of diamylphenol and 222 grams of phosphorus pentasulfide at 150° C. for several hours. It had a neutralization number of 74.

A solution of 141 grams of this acid and 51 grams of allo-ocimene was heated at 130° C. for one hour. The neutralization number of the reacted solution was 10.5. Excess terpene was removed by topping to 165° C. pot temperature at 2.5 mm. The yield of a resinous residue of neutralization number 24 was 162 grams.

Example V

An acid essentially bis (2-ethylhexyl) dithiophosphoric acid was prepared by reacting 624 grams of 2-ethylhexanol and 266 grams of phosphorus pentasulfide at 150° C. for several hours. It had a neutralization number of 130.

A solution of 79 grams of this acid and 136 grams of dipentene was heated at 140° C. for 2 hours. The neutralization number of the reacted solution was 8. Excess terpene was removed by topping to 150° C. pot temperature at 3 mm. The yield of a viscous residue, neutralization number 31, was 93 grams.

Example VI

Diphenyldithiophosphoric acid was prepared as in Example III. It had a neutralization number of 197.

To 94 grams of this acid was added 91 grams of dipentene with the evolution of heat. The solution was heated at 150° C. for 3 hours. The neutralization number of the reacted solution was 13.5. Excess terpene was removed by topping to 150° C. at 1 mm. The yield of viscous residue, neutralization number 28.5, was 128 grams.

Example VII

To 94 grams of the diphenyldithiophosphoric acid described in Example VI was added 91 grams of allo-ocimene. After reaction at 145–150° C. for 5 hours, the solution had a neutralization number of 24.5. The product was dissolved in benzene and treated with dilute sodium hydroxide. The benzene layer was washed with water, filtered and freed of solvent by topping to 150° C. at 2 mm. The yield of viscous residue, neutralization number 8.5, was 126 grams.

The above results show the improvement obtained by reacting a dithiophosphoric acid with a terpene and particularly with pinene.

The copper strip corrosion test consists in placing a polished copper strip about 2"×1½", bent into a V shape, in a 100 ml. beaker so that the flat surface of the strip does not touch the bottom or sides of the beaker. 50 ml. of oil are then placed in the beaker so as to completely cover the copper strip. The beaker is then placed in an electric oven for the specified length of time at a specified temperature. Thereafter the copper strip is removed and washed with petroleum ether and examined for corrosion. To pass this test, the strip must show no more than negligible discoloration after 3 hours and no more than moderate discoloration after 24 hours.

The heat stability test consists in maintaining an oil blend of the additive at 150° C. and observing for the appearance of sludge.

BUBBLE TEST

| Composition of oil blend | Mg. loss in weight | Mg. loss in weight with oil alone |
|---|---|---|
| Oil+0.25% product of Example I+0.05% neutral barium salt of petroleum sulfonate | 4 | 19 |
| Oil+0.05% neutral barium salt of petroleum sulfonate | 19 | 19 |
| Oil +0.2% product of Ex. III | 9 | 26 |
| Oil +0.05% product of Ex. VI | 3 | 45 |
| Oil +0.05% product of Ex. VII | 2 | 45 |

The above results show the effectiveness of these materials in preventing bearing weight loss.

A bubble test is conducted for the purpose of measuring the corrosion of hard metal bearings by an oil including the new compounds. This test is conducted in a 200×25 mm. test tube in which is placed a standard test piece of bearing having a cadmium-silver alloy surface and weighing about 6 g. With it is placed 30 g. of the test oil and a 5 mm. glass inlet tube drawn down to about 1 mm. inside diameter for about 30 mm. at one end is used to carry air to the bottom of the test tube. The whole assembly is held at 175° C. for 22 hours and air blown through the inlet tube and into the bottom of the oil bath at a rate of 2 liters per hour during that time. The test piece is then removed and weighed to determine any loss in weight, which is reported in milligrams of weight loss.

The oil used for this purpose is a blend of Pennsylvania neutral and residuum stocks separately refined by means of chlorex and then blended to give an S.A.E. 20 motor oil having a specific gravity of 0.872, a flash point of 435° F., and a Saybolt Universal viscosity of 318 seconds at 100° F.

A sample of this oil without additive was tested

| Additive | Copper strip corrosion test | | | Heat stability | |
|---|---|---|---|---|---|
| | Conc. in SAE 10 oil, percent | 3 hrs. 100° C. | 24 hrs. 100° C. | Conc. in SAE 30 oil, percent | 65 hrs. 150° C. |
| Unreacted acid of Example I | 0.6 | Failed | Failed | 0.6 | Heavy sludge. |
| Product of Ex. I | 1.0 | Passed | Passed | 1.0 | No sludge. |
| Product of Ex. II | 1.0 | do | do | | Do. |
| Product of Ex. III | 1.0 | do | Failed | 1.0 | Sludge. |
| Product of Ex. IV | 1.0 | | do | 1.0 | Do. |
| Product of Ex. V | 1.0 | | do | 1.0 | |
| Product of Ex. VI | 1.0 | | do | | |
| Product of Ex. VII | 1.0 | | do | | | concurrently with samples containing additive in each of the above runs.

LAUSON ENGINE STABILITY TEST

| Composition | Neutralization number after 36 hrs. | Kinematic viscosity at 210° F. after 36 hrs. |
|---|---|---|
| | | Cs. |
| Oil alone | 11.5 | 8.48 |
| Oil+0.5% product of Example I | 3.5 | 6.42 |
| Oil alone | 13.2 | [1] 7.13 |
| Oil+0.5% product of Example II | 2.9 | [1] 6.10 |
| Oil alone | 12.5 | 9.12 |
| Oil+0.5% product of Example III | 4.6 | 6.70 |

[1] After 24 hours.

The above results show the effectiveness of these materials in preventing the deterioration of motor oils in engines.

Lauson oxidation stability tests are conducted in a Lauson single cylinder, four cycle, liquid cooled gasoline engine with jet lubrication. This engine uses ½ gallon of oil, the oil temperature under operating conditions is 280° F., jacket temperature 212° F., speed 1815 R. P. M., throttle setting, ¼ open, air-fuel ratio, 13:1, length of the test, 36 hours. No oil is added during the test. The fuel used is 100% straight run gasoline plus 2.5 cc. of tetraethyl lead. The oil used in this test was a solvent-refined S. A. E. 10 grade motor oil having a kinematic viscosity of 5.75 at 210° F., and a flash point of 415° F. The neutralization number (milligrams of potassium hydroxide required to neutralize one gram of oil) and the viscosity were determined at the end of the test as an indication of the deterioration that had taken place in the oil.

This application is a division of application Serial Number 782,672, filed October 28, 1947, now Patent No. 2,561,773, issued on July 24, 1951.

What is claimed is:

1. A process of preparing reaction products that comprises reacting about one mol of a saturated diester of dithiophosphoric acid with about one mol of a terpene, at temperatures between about 100° C. to about 200° C.

2. A process of preparing reaction products that comprises reacting about one mol of a saturated diester of dithiophosphoric acid with about one mol of pinene, at temperatures between about 100° C. to about 200° C.

3. A process of preparing reaction products that comprises reacting about one mol of a saturated diester of dithiophosphoric acid with about one mol of dipentene, at temperatures between about 100° C. to about 200° C.

4. A process of preparing reaction products that comprises reacting about one mol of a saturated diester of dithiophosphoric acid with about one mol of a terpene by heating the reactants together at temperatures between about 100° C. to about 200° C.

5. A process of preparing reaction products that comprises reacting about one mol of a saturated diester of dithiophosphoric acid with about one mol of a terpene by heating the reactants together at temperatures between about 100° C. to about 200° C. for at least about two hours.

6. As a new composition of matter a reaction product obtained from the reaction involving about one mol of a saturated diester of dithiophosphoric acid with about one mol of a terpene, at temperatures between about 100° C. to about 200° C.

7. As a new composition of matter a reaction product obtained from the reaction involving about one mol of a saturated diester of dithiophosphoric acid with about one mol of pinene, at temperatures between about 100° C. to about 200° C.

8. As a new composition of matter a reaction product obtained from the reaction involving about one mol of a saturated diester of dithiophosphoric acid with about one mol of dipentene, at temperatures between about 100° C. to about 200° C.

FREDERICK B. AUGUSTINE.

References Cited in the file of this patent

UNITED STATES PATENTS

| Number | Name | Date |
|---|---|---|
| 2,379,312 | May | June 26, 1945 |
| 2,381,377 | Angel et al. | Aug. 7, 1945 |
| 2,455,668 | Fuller et al. | Dec. 7, 1948 |